United States Patent
Fujimoto

(10) Patent No.: US 11,025,924 B2
(45) Date of Patent: Jun. 1, 2021

(54) IMAGE PROCESSING METHOD AND RECORDING MEDIUM

(71) Applicant: SCREEN HOLDINGS CO., LTD., Kyoto (JP)

(72) Inventor: Hiroki Fujimoto, Kyoto (JP)

(73) Assignee: SCREEN HOLDINGS CO., LTD., Kyoto (JP)

(*) Notice: Subject to any disclaimer, the term of this patent is extended or adjusted under 35 U.S.C. 154(b) by 46 days.

(21) Appl. No.: 16/419,541

(22) Filed: May 22, 2019

(65) Prior Publication Data
US 2020/0007871 A1  Jan. 2, 2020

(30) Foreign Application Priority Data

Jun. 27, 2018 (JP) .............................. JP2018-122123

(51) Int. Cl.
*H04N 19/176* (2014.01)
*G06F 17/10* (2006.01)
*G06K 9/32* (2006.01)

(52) U.S. Cl.
CPC ........... *H04N 19/176* (2014.11); *G06F 17/10* (2013.01); *G06K 9/3233* (2013.01)

(58) Field of Classification Search
CPC .................... G06K 9/3233; G06T 7/11; G06T 2207/20021
See application file for complete search history.

(56) References Cited

U.S. PATENT DOCUMENTS

| 9,536,272 B2* | 1/2017 | Yoshioka | ............ G06F 3/03543 |
| 2010/0290678 A1* | 11/2010 | Dekel | ..................... G06T 5/003 |
| | | | 382/128 |
| 2011/0128366 A1* | 6/2011 | Yoshioka | ............ G06F 3/03543 |
| | | | 348/79 |

(Continued)

FOREIGN PATENT DOCUMENTS

| JP | 02-16682 A | 1/1990 |
| JP | 2016-071588 A | 5/2016 |

OTHER PUBLICATIONS

Pramod K Singh, "Unsupervised Segmentation of Medical Images using DCT Coefficients", Advances in Ontologies, Australian Computer Society, Inc., Jun. 1, 2004 (Jun. 1, 2004), pp. 75-81.

(Continued)

*Primary Examiner* — Boubacar Abdou Tchoussou
(74) *Attorney, Agent, or Firm* — McDermott Will & Emery LLP

(57) ABSTRACT

To divide appropriately an image including cells into a plurality of types of regions in accordance with image features, the image processing method of the invention includes acquiring an original image which includes a cell which is cultured, dividing the original image into blocks each of which consists of a predetermined number of pixels and obtaining spatial frequency components that an image in each block has, classifying each of the blocks into a plurality of clusters in a multi-dimensional feature value space in which intensity of a DC component among the spatial frequency components and intensity of each of a plurality of AC components which are different in a spatial frequency from one another are regarded as feature values; and dividing the original image into a plurality of regions on the basis of a result of the classification.

8 Claims, 8 Drawing Sheets

(56) References Cited

U.S. PATENT DOCUMENTS

2017/0003490 A1  1/2017  Sueki et al.

OTHER PUBLICATIONS

Kuan Li et al., "Multiclass boosting SVM using different texture features in HEp-2 cell staining pattern classification", Pattern Recognition (ICPR), 2012, 21st International Conference on, IEEE, Nov. 11, 2012 (Nov. 11, 2012), pp. 170-173.

Extended European Search Report issued in corresponding European Patent Application No. 19180935.9-1210, dated Oct. 2, 2019.

* cited by examiner

F I G. 5A
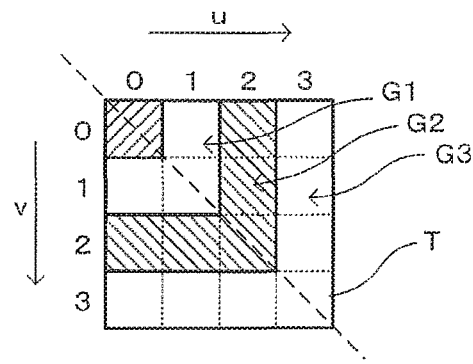
F I G. 5B
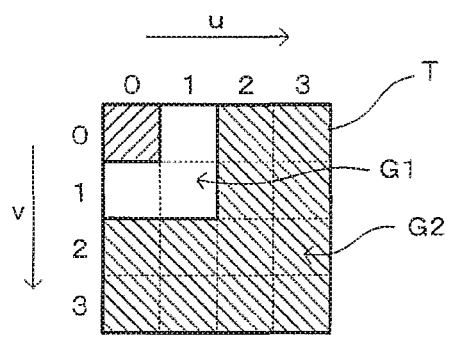
F I G. 5C
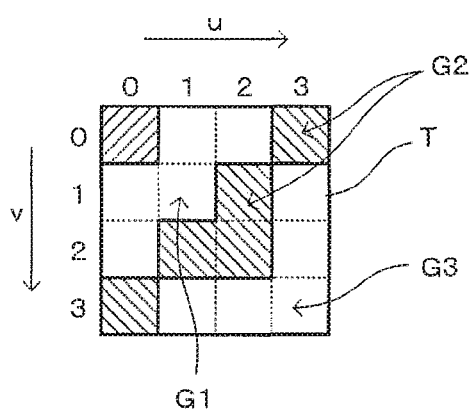

IMAGE PROCESSING METHOD AND RECORDING MEDIUM

CROSS REFERENCE TO RELATED APPLICATION

The disclosure of Japanese Patent Application No. 2018-122123 filed on Jun. 27, 2018 including specification, drawings and claims is incorporated herein by reference in its entirety.

BACKGROUND OF THE INVENTION

1. Field of the Invention

The present invention relates to an image processing technique for dividing regions of cells and the other regions from an image including the cells and a background thereof which are imaged under a culture environment.

2. Description of the Related Art

In an image captured including cells under a culture environment, there are some cases where a region of a cell which is originally an imaging target and another region of a background thereof are treated in distinction in the image. In order to obtain the size of the cell, for example, it is necessary to demarcate a boundary between the cell and the background. Conventionally, the region of the cell has been specified, for example, by staining the cell with a predetermined chemical agent or putting a fluorescent reagent therein. For the purpose of, for example, temporal observation of change of the cell or the like, however, it is sometimes required to specify a cell region without using any process in which the cell which is an imaging target is modified.

Since the cell in culture medium is almost transparent and has a refractive index which differs little from that of water, the boundary between the cell and the background in the captured image is unclear in most cases. For solving this problem, the present applicant has proposed a bright field imaging technique which makes it possible to obtain an image in which an outline of the cell becomes especially clear (for example, see JP2016-071588A). For distinction between the cell and the background in the image, for example, image processing such as a binarization (image thresholding) process using the difference in the luminance between the cell and the background, edge detection for extracting a cell outline, or the like can be used.

In the case of temporal observation of the cell under the culture environment, in an early stage of the culture, the captured image includes the cell and a culture medium which is a mostly uniform background. For this reason, it is relatively easy to distinguish between the cell and the background. However, as the culture proceeds, waste products drained from the cell, bodies of dead cells, and the like (debris) appear around the cell which is an imaging target and are included in the image. For this reason, it is difficult to appropriately distinguish between the cell and the debris by a simple process such as the binarization, the outline extraction, or the like.

Further, in the culture using stem cells such as ES (Embryonic Stem) cells, iPS (Induced Pluripotent Stem) cells, or the like, for example, the stem cells are sometimes cocultured with feeder cells. Furthermore, as the culture proceeds, in the course of differentiation from the stem cells to somatic cells, cells having morphological characteristics different from those of the stem cells appear. For this reason, a plurality of types of cells are mixed in the captured image and there are some cases where these cells need to be distinguished in the image.

From these points, a technique has been required, for dividing the image into a plurality of types of regions, especially into three or more types of regions in accordance with the difference in the image feature such as a texture appearing in the image, or the like.

SUMMARY OF THE INVENTION

The present invention is intended to solve the above problem, and to provide a technique for appropriately dividing an image including cells into a plurality of types of regions in accordance with image features.

In order to achieve the above object, the present invention is intended for an image processing method. According to one aspect of the present invention, the image processing method includes acquiring an original image which includes a cell which is cultured, dividing the original image into blocks each of which consists of a predetermined number of pixels and obtaining spatial frequency components that an image in each block has, classifying each of the blocks into a plurality of clusters in a multi-dimensional feature value space in which intensity of a DC component among the spatial frequency components and intensity of each of a plurality of AC components which are different in a spatial frequency from one another are regarded as feature values, and dividing the original image into a plurality of regions on the basis of a result of the classification.

In the present invention configured as above, an image is divided on the basis of a distribution of local spatial frequency components in the image. Specifically, the image is divided into the blocks and the spatial frequency component for each block is obtained. The DC component among the spatial frequency components represents an average luminance in the block. On the other hand, the AC component represents a change of the luminance in the block, and a relatively low frequency component represents a gentle luminance change and a high frequency component represents a state of finer luminance change. Therefore, when the block is represented by the intensity for each spatial frequency component, the DC component reflects the brightness of the block and the AC component reflects the texture in the block. Especially, the higher frequency represents a texture having finer structure.

Assuming that the intensity of each frequency component is regarded as the feature value of the block, the brightness and the complexity of the texture of an image content in the block can be quantitatively represented by these feature values. Even in the case, for example, where a plurality of types of cells are included in the image, the difference in the brightness or the texture is manifested as the difference in the feature value.

Using this point, the original image can be divided into a plurality of regions in accordance with the image content. Specifically, the position occupied by each block in the multi-dimensional feature value space is considered. In the feature value space, the respective intensities of the DC component and the plurality of AC components that the block has are regarded as the feature values. A significant difference in the distribution appears between blocks corresponding to cells and the other blocks or among blocks corresponding to different types of cells. Therefore, by classifying the blocks which are parts of the original image on the basis of the feature values, the blocks having like textures form one cluster in the feature value space. It can be thought that a plurality of blocks in proximity in the feature value space include the same types of cells. On the other hand, when two blocks are far away from each other in the feature value space, it can be thought that these blocks include different types of cells. Thus, by using the classification result based on the feature value indicating the spatial frequency component, it is possible to divide the original image into a plurality of regions in accordance with the image content.

The image processing method in accordance with the present invention can use a computer as an execution subject. In this sense, the present invention can be achieved as a computer program which causes a computer to perform the above process. Further, the present invention can be also achieved as a recording medium which non-transitorily records thereon the computer program.

As described above, according to the image processing method of the present invention, an original image is divided into a plurality of regions on the basis of the characteristic features of spatial frequency components that an image has in each of blocks obtained by dividing the original image. By using the intensity of the DC component and the respective intensities of a plurality of AC components having different frequencies as feature values, appropriate classification can be achieved in accordance with the difference in the brightness and the texture of the whole block.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIGS. 5A to 5C are views each showing an example of grouping of the DCT coefficients.

DETAILED DESCRIPTION OF THE PREFERRED EMBODIMENTS

Hereinafter, one embodiment of an image processing method in accordance with the present invention will be described. The image processing of this embodiment is a region dividing process to an image obtained by imaging a cell or an aggregate of cells which is cultured in a culture medium. Specifically, the process is for dividing the image into regions of cells and the other regions from the image and for further dividing regions corresponding to a plurality of types of cells from one another if the plurality of types of cells are included in the image. This image processing is performed on an unprocessed original image which is captured by an imaging apparatus having an imaging function for capturing an image of a sample including cells. The imaging apparatus may perform this image processing as one of post-processings on image data obtained after the imaging, and further, a computer device which receives the image data from the imaging apparatus or an appropriate storage part may perform this image processing.

Herein, an aspect of the present invention in which a general-purpose computer device performs the image processing of the present embodiment on original image data generated by imaging which is already performed will be exemplarily described. The configuration of the imaging apparatus is not particularly limited only if the imaging apparatus has a function of imaging a sample including cultured cells together with a culture medium and outputting the captured image as digital image data. Further, it is preferable that the image should be a bright field image. Furthermore, the computer device having a general hardware configuration, which is commercialized as, for example, a personal computer, can be used. Hereinafter, detailed description on the hardware will be omitted.

Figure 1:
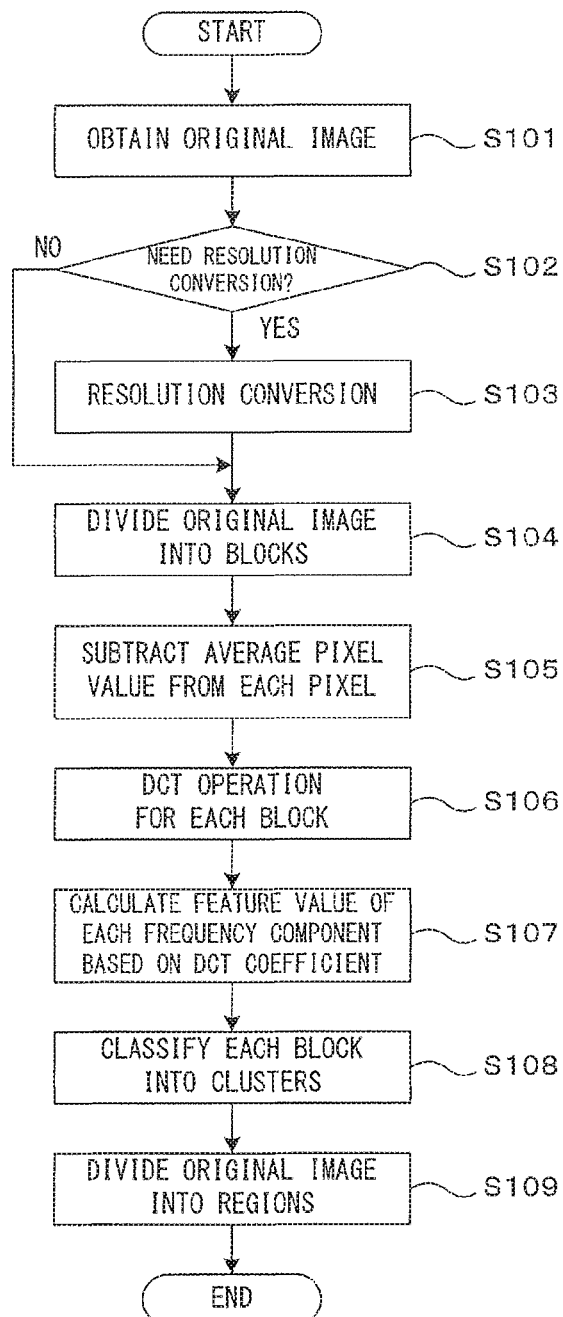
FIG. 1 is a flowchart showing a region dividing process of the embodiment.

FIG. 1 is a flowchart showing a region dividing process of the present embodiment. First, with reference to FIG. 1, an outline of the region dividing process of the present embodiment will be described, and then specific operations thereof will be described in detail. A computer device acquires an original image (Step S101). The original image is obtained by bright field imaging of a sample including cells cultured in a culture medium, with an appropriate imaging apparatus and an appropriate imaging condition. It is assumed that the original image includes at least one whole cell. Therefore, the original image can include the cell, a debris, a background, and the like other than the cell.

As the cells, a plurality of types of cells having different morphological characteristics may be included in the original image. For example, in an environment where a stem cell and a feeder cell are cocultured in the culture of the stem cell, there is a possibility that both these cells may be included in the original image. Further, in a case where part of the stem cell is differentiated to a somatic cell, there may be a state where the stem cell and the somatic cell are mixed.

It is determined whether resolution conversion is needed or not on the acquired original image (Step S102). The resolution conversion is a process for converting the pixel size of the original image at the imaging into a pixel size suitable for the region dividing process. When it is determined that the resolution conversion is needed, the resolution conversion is performed (Step S103). Hereinafter, both of an image at the imaging to which the resolution conversion is performed and an image after the resolution conversion are referred to as an "original image".

In the following description, unless otherwise noted, a simple word of "pixel" refers to a pixel of the original image to be used in processes of Step S104 and thereafter. The pixel after the conversion in the case where the resolution conversion is performed or the pixel at the imaging in the case where the resolution conversion is not performed is the "pixel" referred to herein. When distinction is particularly required, the pixel before the conversion (i.e., the pixel at the imaging) is sometimes referred to as an "original pixel". Specifically, it is assumed that the "original pixel" refers to a pixel at the imaging regardless of whether the resolution conversion is performed or not.

The original image is divided into a plurality of blocks (Step S104). In the present embodiment, a square with four pixels by four pixels in the original image is regarded as one block. When the resolution conversion is performed, as described above, the pixel referred to herein is a pixel after the conversion. When the number of pixels for one line is indivisible by the number of pixels for one side of one block, i.e., "4", some pixels may not be used in the process at an end portion of the original image. Further, in order to avoid such a fraction, the end portion of the original image may be removed in advance.

Next, an average pixel value in the whole original image is subtracted as an offset value from the pixel value of each pixel (Step S105). This process is performed for a level shift for the convenience of later operations. When the pixel value is represented as, for example, 8-bit data, each pixel can take values in 256 levels, from 0 to 255. But by subtracting the average pixel value, some pixels can each take a negative value as the pixel value.

For each of the thus divided blocks, a spatial frequency component is obtained. For this purpose, in the present embodiment, two-dimensional discrete cosine transform (hereinafter, abbreviated to "DCT") operation is used (Step S106). As used in the JPEG (Joint Photographic Experts Group) image compression technique, for example, the image content in each block is decomposed into two-dimensional spatial frequency components by the two-dimensional DCT operation.

The image content of the block can be reproduced by synthesizing the spatial frequency components. The intensity for each frequency component is different in accordance with the content of the image. As well known in the JPEG-based image compression technique, the intensity of each frequency component can be obtained as a DCT coefficient acquired by the DCT operation.

A low-frequency component among the spatial frequency components represents a gentle change of the brightness in the image in the block. Among these components, a DC component corresponds to an average value of the brightness in the block. On the other hand, a high-frequency component represents a finer change of the brightness, and has information on the texture of the image in the block. The higher frequency represents a finer texture. Then, a feature value corresponding to the intensity of each frequency component is calculated on the basis of the obtained DCT coefficient (Step S107).

Specifically, the DCT coefficient corresponding to the DC component is regarded as one feature value, and as to the AC components, the DCT coefficients are divided into several groups in accordance with the level of the corresponding frequency and the total of the DCT coefficients in each group is regarded as one feature value. Specific grouping method will be described later.

By this process, one block can be represented by a DC component feature value indicating the brightness and a plurality of AC component feature values each indicating the texture. In accordance with whether the block represented by the feature values strongly has a feature as any one type of cell or has a feature as a non-cell other than the cells, it can be determined which type of cell the block corresponds to or whether or not the block corresponds to a non-cell other than the cells (Step S108). On the basis of the result, the original image is divided into a plurality of regions, such as a region of a cell and another region of a non-cell, or regions depending on the types of cells (Step S109). The above is an outline of the region dividing process of the present embodiment.

Figure 2:
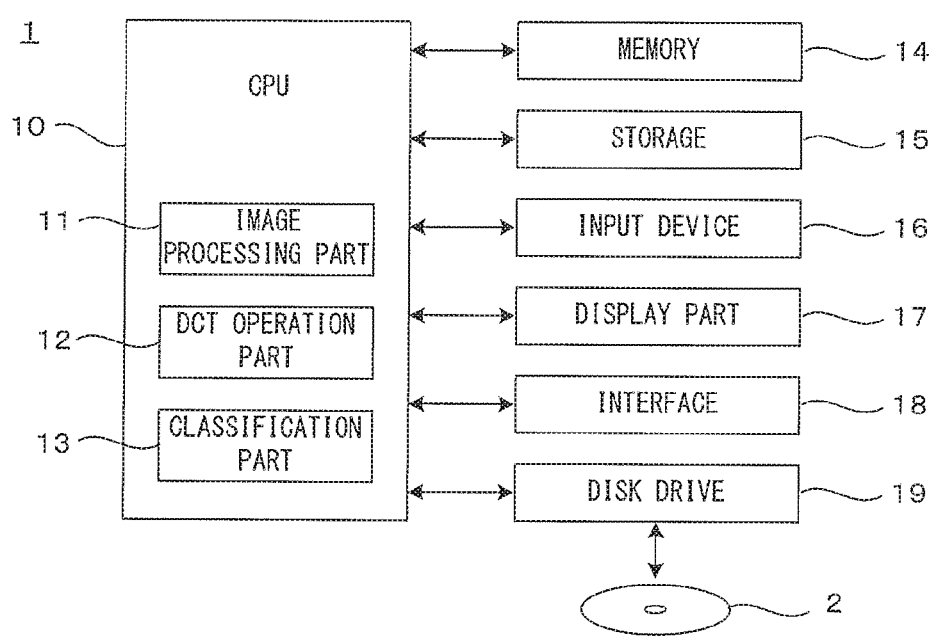
FIG. 2 is a diagram showing an exemplary configuration of a computer device which performs the region dividing process of the present embodiment.

FIG. 2 is a diagram showing an exemplary configuration of a computer device which performs the region dividing process of the present embodiment. The computer device 1 has, for example, a general configuration as a personal computer, and includes a CPU (Central Processing Unit) 10, a memory 14, a storage 15, an input device 16, a display part 17, an interface 18, a disk drive 19, and the like.

The CPU 10 executes a control program prepared in advance. Thereby function blocks for performing the region dividing process, i.e., an image processing part 11, a DCT operation part 12, a classification part 13, and the like are implemented by software. Note that these function blocks may be configured by dedicated hardware. The memory 14 temporarily stores therein various data generated during the operation performed by the CPU 10. The storage 15 stores therein the control program to be executed by the CPU 10 and image data of the original image, processed image data, and the like in the long term.

The input device 16 serves to receive an instruction input from an operator, and includes a mouse, a keyboard, or the like. Further, the display part 17 is, for example, a liquid crystal display having a function of displaying an image, and displays thereon the original image, the processed image, and various information such as a message to the operator and the like. Note that a touch panel in which the input device and the display part are unified may be provided.

The interface 18 exchanges various data with an external device via a telecommunications line. The disk drive 19 takes in an external recording disk 2 which records therein various data such as the image data, the control program, and the like. The image data, the control program, or the like stored in the recording disk 2 is read by the disk drive 19 and stored into the storage 15. The disk drive 19 may have a function of writing data generated inside the computer device 1 into the recording disk 2.

The control program which causes the computer device 1 to perform the region dividing process of the present embodiment may be read out when the disk drive 19 makes access to the recording disk 2 which non-transitorily records thereon the control program, or may be given from the external device via the interface 18. The same applies to the original image data.

The image processing part 11 performs the resolution conversion of the original image, block division, region division of the final image, and the like. Further, the DCT operation part 12 performs the above-described DCT operation on each block, to thereby obtain the spatial frequency components. The classification part 13 classifies the blocks on the basis of the feature values obtained for each block.

Figure 3A:
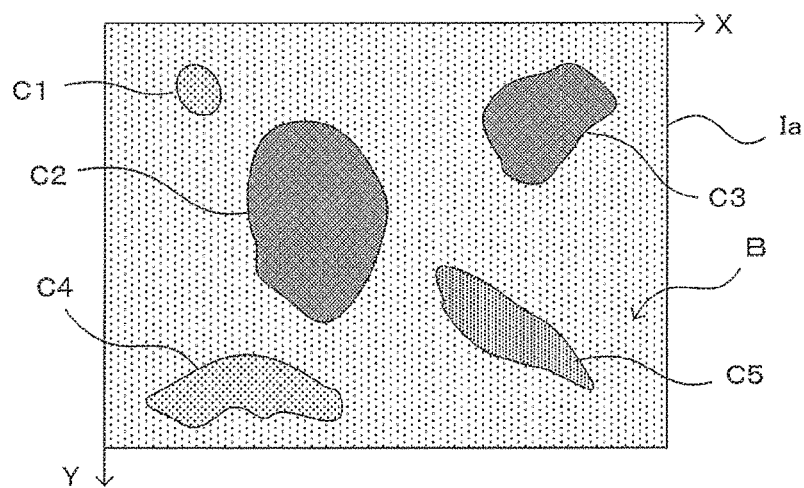
FIGS. 3A to 3C are views each showing schematically an exemplary original image.
Figure 3B:
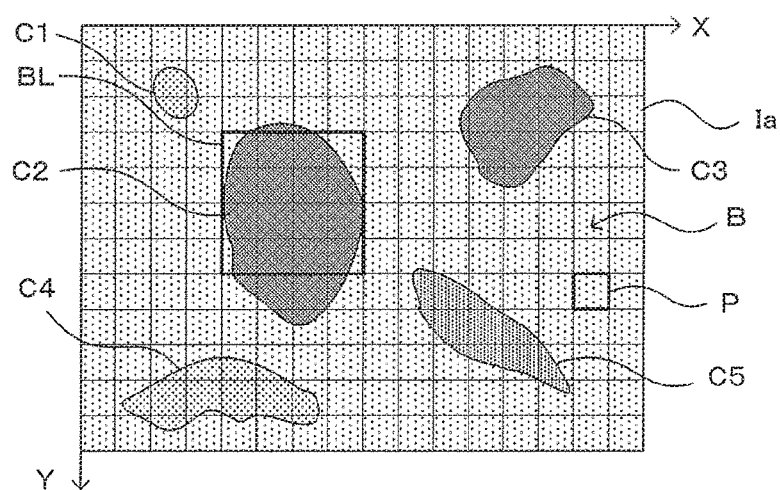

FIGS. 3A and 3B are views each showing schematically an exemplary original image. As shown in FIG. 3A, it is assumed that the original image Ia acquired in Step S101 includes, as image objects, cells C1 to C5 and a background B corresponding to the culture medium. Herein, it is assumed that the cells C1 and C4 are of the same type and the respective insides thereof have like texture. Similarly, it is assumed that the cells C2 and C3 are of the same type. The cells C1, C2, and C5 are of different types. In these figures, the difference in the density inside the cell represents the difference in the type.

In these figures, it is assumed that the horizontal coordinate of the image is an X coordinate and the vertical coordinate thereof is a Y coordinate. The shapes and densities of these image objects are only one exemplary case, and in an actually-obtained image, various shapes and densities can be taken. Further, besides the cells C1 to C5 and the background B, the debris may be sometimes included in the original image. Further, there may be a case where the image is occupied by the cells C1 to C5 and the debris surrounding the cells, and the background corresponding to the culture medium is not included. Furthermore, depending on the amount of culture medium, a lighting condition at the imaging, or the like, the brightness of the background B is not always constant.

From these points, it should be thought that the relation of an arrangement, densities, and the like of the cells and the background in the image is different from one original image to another. The image processing described herein can be held regardless of the relation. The basic concept of the region dividing process of the present embodiment is dividing the original image Ia into small blocks and determining whether each block strongly has an image feature of any one type of cell or strongly has a feature other than that, on the basis of the spatial frequency components that the block has.

In this region dividing process, the original image Ia is divided into square blocks each having a predetermined size and processed. As shown in FIG. 3B, one block BL is a region of square consisting of four pixels in the X direction and four pixels in the Y direction, i.e., sixteen pixels P in total. It is desirable that the size of the block BL should be set in accordance with the size of the cell to be extracted, in the image.

When the block size is too small, one block includes only small part of the cell, the characteristic feature of the cell in the image cannot be sufficiently reflected on the process. This causes deterioration in the accuracy of the region division. Further, when the block size is too large, the characteristic feature of the cell and that of an object other than the cell are mixed in one block, and this also causes deterioration in the accuracy. From the findings of the inventor of the present application, it is preferable that the size of one block BL should be selected so that one block can be generally put inside the cell to be extracted, in the image.

When the cell is, for example, a somatic cell of human being, the diameter thereof is about 10 μm to 20 μm, and the stem cell is slightly smaller than this. Therefore, as to the size of the block BL, it is preferable that the length of one side converted into the sample size should be almost equal to or slightly smaller than this. From this point, as to the size of one pixel P, it is preferable that one side should be 2.5 μm to 5 μm or slightly smaller.

Assuming that the resolution in the imaging is, for example, 6400 dpi (dots per inch), the pixel size is about 4 μm. Further, assuming that the resolution is 16000 dpi, the pixel size is about 1.6 μm. From this point, the resolution required to obtain the above-described size of the pixel P is suitably 6400 dpi to 16000 dpi. These values, however, are values suitable for performing the region dividing process of the present embodiment. But not limited to this, it is basic that the imaging should be performed with as high resolution as possible.

Figure 3C:
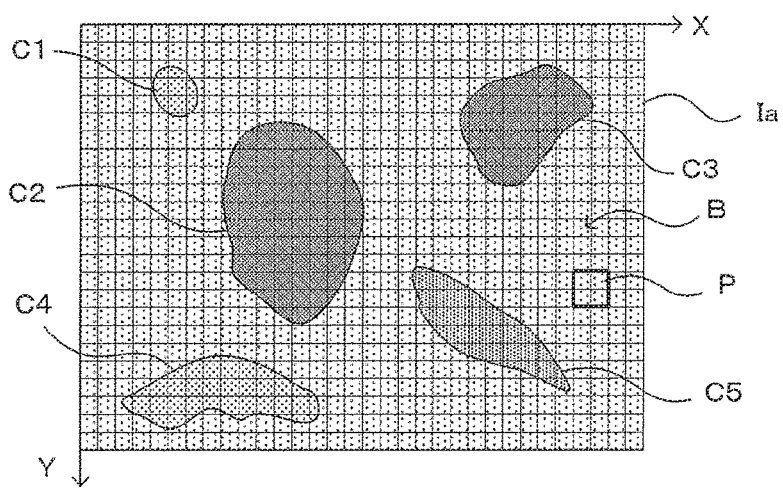

When the original image can be captured with a resolution of 32000 dpi (a pixel size of 0.8 μm), for example, there is no necessity of taking the trouble to reduce the resolution for the convenience of the region dividing process. In this case, as shown in FIG. 3C, it is assumed that four pixels in the original image Ia at the imaging are artificially regarded as one pixel P and an average pixel value thereof is determined as a pixel value of the pixel P. With this operation, it is possible to obtain the pixel size (1.6 μm) suitable for the region dividing process without reducing the resolution at the imaging. In the present embodiment, such an operation is referred to as a "resolution conversion".

Whether the resolution conversion is needed or not depends on the relation between the pixel size at the imaging and the size of the cell to be processed. When the relation is known in advance, it is possible to determine whether the resolution conversion is needed or not from the already-known relation. Further, whether to perform the resolution conversion may be determined on the basis of an instruction input from a user. When it is determined that the resolution conversion is needed, the resolution conversion is performed (Step S103).

When the resolution conversion is performed, in Step S104, a square with four pixels by four pixels in the converted image is determined as one block BL. When the resolution conversion is not performed, a square with four pixels by four pixels in the image at the imaging of the original image Ia is determined as one block BL. When the number of pixels for one line is indivisible by the number of pixels for one side of one block, i.e., "4" in at least one of the X direction and the Y direction, some pixels may not be used in the process at an end portion of the original image. Further, in order to avoid such a fraction, the end portion of the original image may be removed in advance.

Next, an average pixel value in the whole original image Ia is subtracted as an offset value from the pixel value of each pixel (Step S105). When the pixel value is represented as, for example, 8-bit data, each pixel can take values in 256 levels, from 0 to 255, but by subtracting the average pixel value, some pixels can each take a negative value as the pixel value. From the findings of the inventor of the present application, in a cell image in which the difference between the maximum pixel value and the minimum pixel value in the image is relatively small, by subtracting the average pixel value in the whole image from each pixel, the positive-negative balance of respective pixel values become excellent. When it is assumed that the pixel value of each pixel P is p (X, Y) and the average pixel value is $p_{av}$, the pixel value g (X, Y) of the pixel P after the subtraction is expressed by the following equation (Eq. 1).

$$g(X,Y)=p(X,Y)-p_{av} \qquad (Eq.\ 1)$$

For each of the thus divided blocks, the DCT operation is performed (Step S106). By the DCT operation, the image content in each block is decomposed into two-dimensional spatial frequency components in each of the X direction and the Y direction. The DCT operation process is widely known as it is also used in the JPEG-based image compression process. Therefore, description will be omitted hereinafter on items to which the same concept as that of the JPEG image compression process can be applied.

Figure 4:
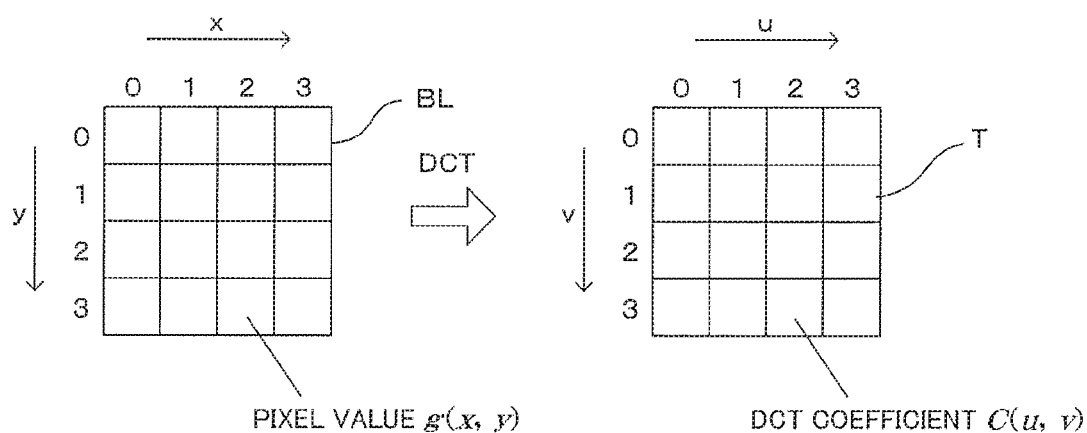
FIG. 4 is a view showing a concept of the DCT operation.

FIG. 4 is a view showing a concept of the DCT operation. The left part of this figure shows part of the original image, and specifically shows one block BL consisting of (4×4) pixels. For representing a position of each pixel in the block in distinction from a coordinate position in the original image, with lowercase letters, it is assumed that the horizontal coordinate is an x coordinate and the vertical coordinate is a y coordinate. The DCT operation can be regarded as an operation for obtaining a DCT coefficient table T in a matrix with 4 rows and 4 columns shown in the right part of this figure from a pixel value g (x, y) of each pixel in the block BL.

A row position u (u=0, 1, 2, 3) of the DCT coefficient table T represents the spatial frequency component in the x direction, and specifically, u=0 represents the DC component, u=1 represents a fundamental frequency component, and u=2, 3 represent twice the fundamental frequency and three times the fundamental frequency, respectively. Similarly, a column position v (v=0, 1, 2, 3) represents the spatial frequency component in the y direction, and specifically, v=0 represents the DC component, v=1 represents the fundamental frequency component, and v=2, 3 represent twice the fundamental frequency and three times the fundamental frequency, respectively.

The DCT coefficient C (u, v) indicating the intensity of each frequency component is expressed by the following equation (Eq. 2).

$$C(u, v) = \frac{2}{N} p_u p_v \sum_{x=0}^{N-1} \sum_{y=0}^{N-1} g(x, y) \cos\frac{(2x+1)u\pi}{2N} \cos\frac{(2y+1)v\pi}{2N} \quad \text{(Eq. 2)}$$

where $$p_u = \begin{cases} 1/\sqrt{2}, & u=0 \\ 1, & u \neq 0 \end{cases}, p_v = \begin{cases} 1/\sqrt{2}, & v=0 \\ 1, & v \neq 0 \end{cases}$$

Herein, a constant N is a block size. In the JPEG system, N=8, and specifically (8×8) pixels is regarded as one block. However, as described above, since (4×4) pixels is regarded as one block in the present embodiment, N=4. From the findings of the inventor of the present application, in this processing method in which it is not an object to compress and/or decompress images and the DCT coefficient is used as the feature value, a more excellent result can be achieved by determining (4×4) pixels as the block size. Further, by adopting (4×4) pixels as the block size, it is possible to reduce the amount of computation and suitably achieve a speedup.

Among the DCT coefficients C (u, v) constituting the DCT coefficient table T, the coefficient C (0, 0) representing the DC component is regarded as a DC component feature value. Further, the coefficients representing the AC components are divided into a plurality of groups and summed up in each group. This total value or a normalized value obtained by dividing the total value by the number of coefficients which are summed up is regarded as one feature value corresponding to the group. Furthermore, the DCT coefficient can take both a positive value and a negative value. In order to prevent these values from offsetting one another when summed up, for example, the total value of the DCT coefficients can be obtained as the sum of respective absolute values thereof.

FIGS. 5A to 5C are views each showing an example of grouping of the DCT coefficients. As the basic concept, as shown in FIG. 5A, it is assumed that three DCT coefficients which are represented by reference signs C (1, 0), C (0, 1), and C (1, 1), whose maximum frequency is the fundamental frequency (u=1, v=1), belong to a first group G1. Five DCT coefficients C (2, 0), C (2, 1), C (0, 2), C (1, 2), and C (2, 2) whose maximum frequency is twice the fundamental frequency (u=2, v=2) belong to a second group G2. Further, seven DCT coefficients C (3, 0), C (3, 1), C (3, 2), C (0, 3), C (1, 3), C (2, 3), and C (3, 3) other than the above DCT coefficients or the DC component C (0, 0) belong to a third group G3. This is based on a concept that the intensities of the frequency components indicating almost the same extent of fineness of the texture in the image are summed up.

The total value obtained by summing up the DCT coefficients included in each of the groups G1, G2, and G3 or the normalized value obtained by dividing the total value by the number of DCT coefficients in the group (for example, three in the group G1) can be regarded as an AC component feature value corresponding to the frequency. The frequency which is representative of each group can be represented by, for example, the maximum frequency in the group.

The reason for performing normalization is to evaluate each frequency component with the same weight in the later classification process. This can prevent only the texture corresponding to a specific frequency component from producing a great effect on a classification result. Note that the DC component feature value does not relate to the texture but represents the luminance of the whole block. Therefore, it is not always necessary to perform normalization with the AC component feature value representing the texture.

Furthermore, an appropriate grouping can be performed, not limited to the above principle. For example, as shown in FIG. 5B, all the twelve coefficients other than the coefficient C (0, 0) of the DC component or those of the first group G1 may be included in the second group G2.

As indicated by the broken line in FIG. 5A, however, it is desirable that the DCT coefficients located at symmetrical positions about the straight line v=u where variables u and v are regarded as coordinates in the DCT coefficient table T should be included in the same group. The reason is that since the variable u corresponds to the x coordinate and the variable v corresponds to the y coordinate in the image and there is no special anisotropy between the x direction and the y direction in principle in the image of the cultured cells or the like which are imaging targets, the DCT coefficients should not be treated differently between the u direction and the v direction.

Further, in the exemplary case of grouping shown in FIG. 5C, five coefficients C (1, 0), C (2, 0), C (0, 1), C (1, 1), and C (0, 2) are included in the first group G1. Five coefficients adjacent to the above coefficients, C (3, 0), C (2, 1), C (1, 2), C (2, 2), and C (0, 3) are included in the second group G2. The other five coefficients C (3, 1), C (3, 2), C (1, 3), C (2, 3), and C (3, 3) are included in the second group G3. When the grouping is made thus, since the number of DCT coefficients whose values are to be summed up in each group are equal to one another in the groups and the respective AC component feature values obtained in the groups have the same weight, it, becomes unnecessary to perform normalization.

As the number of groups constituted of the DCT coefficients increases, a larger amount of information indicating the characteristic features of the image are stored, but the amount of computation in the later processes increases since the dimension of the feature value space becomes higher. By grouping the coefficients having frequency components which are relatively close to one another, it is possible to reduce the computational load while maintaining the information of the image.

A feature value vector representing the luminance and the texture of each block BL is constituted of the feature values of the frequency components obtained as above. Specifically, the DC component feature value representing the brightness of the block BL and the plurality of AC component feature values representing the texture in the block form the feature value vector.

On the basis of this feature value vector, it is determined which category among the plurality of types of "cells" and "non-cell" each block corresponds to (Step S108). This determination is performed on the basis of the position of a point indicated by the feature value vector corresponding to the block in the multi-dimensional feature value space constituted of combination of the feature values of the frequency components. In order to perform this determination, it is necessary to specify its criterion of judgment, specifically a range occupied by the characteristic feature of each category in the multi-dimensional feature value space.

In a case where the type of cells to be captured, the type and amount of culture medium, the imaging conditions (the imaging magnification, the intensity of lighting, and the like) and the like are fixed among a plurality of imaging, by collecting a lot of typical images of cells which are captured in the same conditions as exemplary cases and using an appropriate machine learning algorithm. It is possible to specify a range occupied by a cluster corresponding to each category in advance in the multi-dimensional feature value space. In this case, it is possible to determine which type of cells the block corresponds to or whether or not the block corresponds to the non-cell, on the basis of which cluster the feature value of the block selected out of an unknown original image belongs to.

In general, however, the imaging conditions and the like differ from one original image to another. For this reason, in order to perform a determination with higher accuracy, it is convenient if the criterion of judgment can be drawn up from the information read out from the original image to be processed. Hereinafter, an exemplary method therefor will be described.

Figure 6:
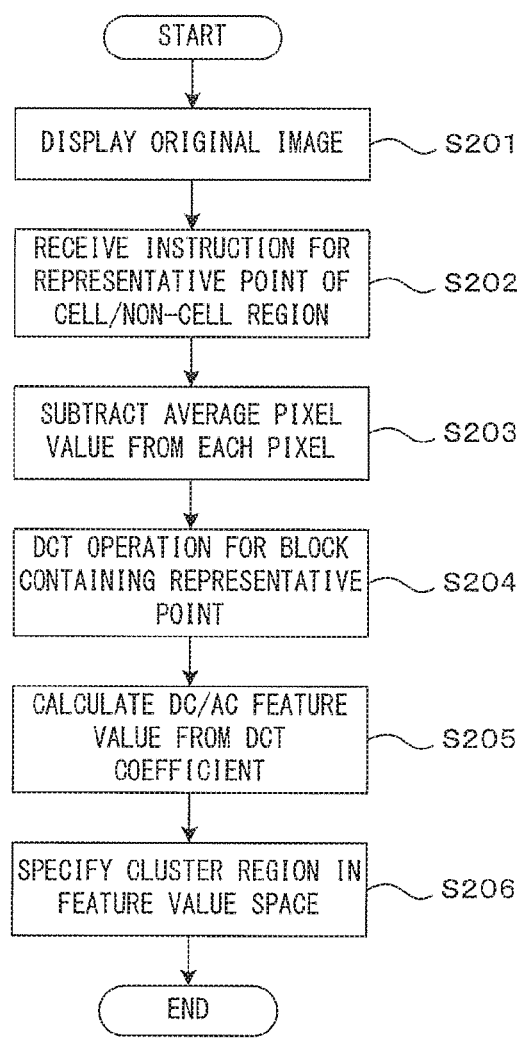
FIG. 6 is a flowchart showing a process for drawing up the criterion of judgment.
Figure 7A:
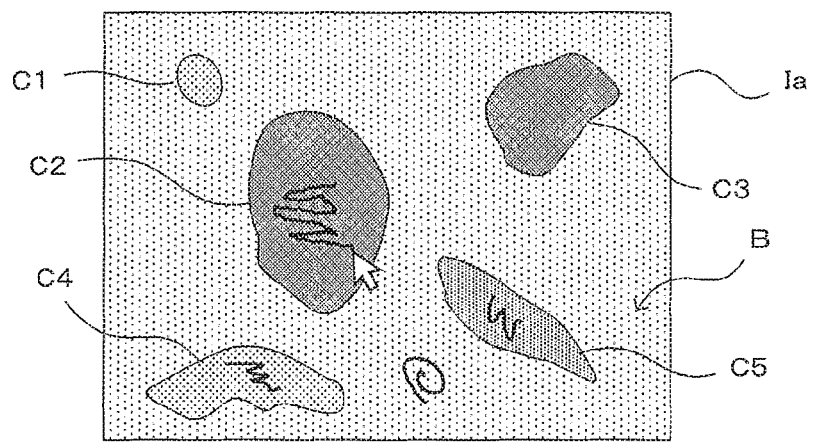
FIGS. 7A and 7B are views each illustrating an instruction input mode during the process.
Figure 7B:
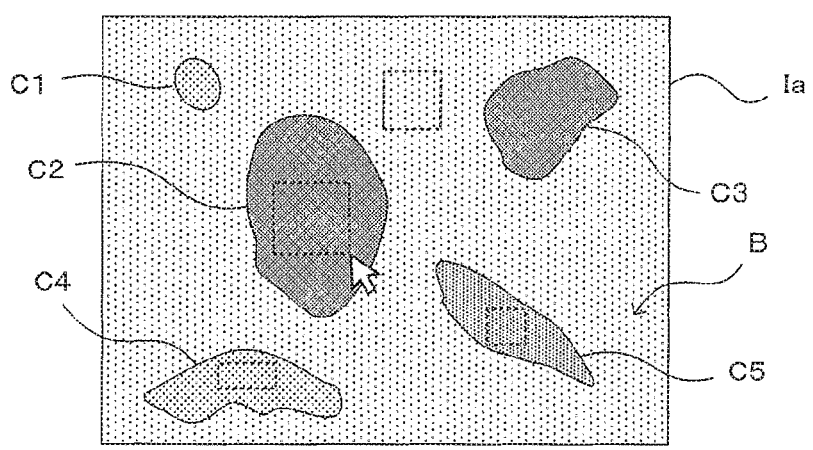

FIG. 6 is a flowchart showing a process for drawing up the criterion of judgment. Further, FIGS. 7A and 7B are views each illustrating an instruction input mode during the process. In this process, an instruction about a typical example which strongly has the characteristic feature of each of a plurality of types of cells among the acquired original image Ia is given from an operator and a boundary between the categories in the multi-dimensional feature value space is specified from the information. This process can be performed at any timing from the time when the computer device 1 acquires the original image Ia (Step S101) to the time when classification of the blocks starts (Step S108). The process is performed when the CPU 10 executes the control program stored in the storage 15.

First, the acquired original image Ia is displayed on the display part 17 and presented to the operator (Step S201). Then, in the displayed original image Ia, an instruction input from the operator, which specifies a representative point belonging to the region of the cell and another representative point corresponding to the region of the non-cell is received (Step S202). In a case where there are a plurality of types of cells and it is necessary to distinguish these types, the instruction input is received for each type. Note that, when there is a clear apparent difference between the region of the cell and the region of the non-cell, only the representative point belonging to the region of the cell may be specified.

For higher accuracy, it is preferable to specify a plurality of representative points. Then, as shown in FIG. 7A, for example, by causing the operator to perform an operation of continuously moving a pointer in the region of the cell C2 or another operation of selecting some points with mouse manipulation, touch pen input, or the like, it is possible to acquire and collect a plurality of points on the locus as the representative points of the cell C2. An open arrow in this figure represents the pointer moving on a screen in conjunction with the manipulation of a mouse or the like by the user. Instructions of the representative points corresponding to the different type of cells C4, C5 and the background B are also received in the same manner.

Further, as indicated by the dotted line in FIG. 7B, a rectangular region inside the cell, another rectangular region outside the cell, or the like may be specified as a two-dimensional region. When there is a debris in the image, it is desirable to include both a region of the debris and the region of background in the regions outside the cell to be specified. With this operation, the representative points extracted from the regions outside the cell include both a representative point having the characteristic feature of the debris and another representative point having the characteristic feature of the background. For this reason, when the boundary between the region of the cell and the region of the non-cell in the feature value space is determined, it is possible to more strongly reflect the information on the non-cell. As a matter of course, the representative points may be specified individually for the debris and the background.

After some representative points are specified thus, like in the above-described region dividing process, an average pixel value in the whole original image Ia is subtracted from the pixel value of each pixel (Step S203), the DCT operation is performed for a virtual block which has a pixel size of 4×4 and includes a representative point (Step S204), and a DC component feature value and a plurality of AC component feature values are calculated from the DCT coefficients (Step S205). With this operation, the distribution in the multi-dimensional feature value space in a case where the block including the representative point is used as a typical example becomes manifest, and from the result, the regions occupied by the cluster of various "cells" and the region occupied by the cluster of the "non-cell" in the multi-dimensional feature value space are specified (Step S206).

Figure 8A:
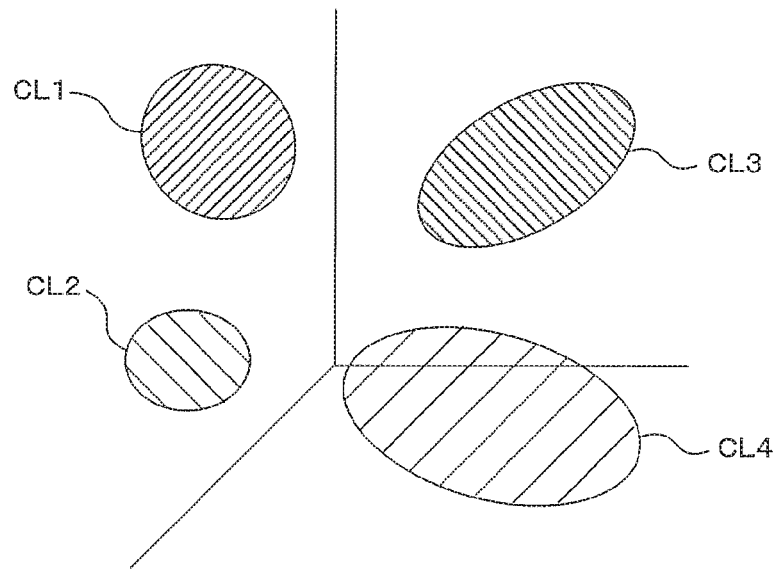
FIGS. 8A and 8B are views each schematically showing an example of cluster distribution in the feature value space.
Figure 8B:
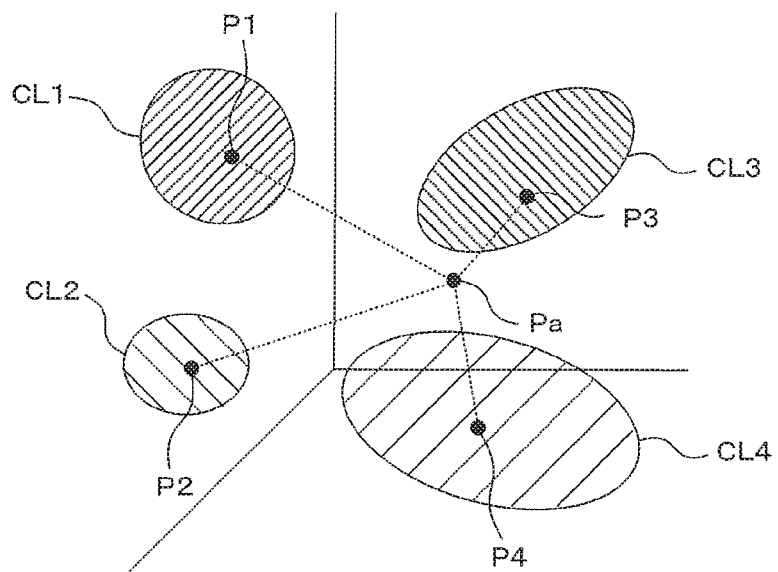

FIGS. 8A and 8B are views each schematically showing an example of cluster distribution in the feature value space. The dimension of the feature value space can take any of various values, and herein a three-dimensional feature value space is exemplarily shown. When the plurality of types of cell regions and the non-cell region are specified by the user by using the method shown in FIG. 7A or 7B, the DC component feature value and the AC component feature values are obtained for some blocks including the representative points in these regions. When each block corresponding to the representative point is plotted in the multi-dimensional feature value space, as shown in FIG. 8A, it can be thought that a cluster CL1 corresponding to the cell C2, a cluster CL2 corresponding to the cell C4, a cluster CL3 corresponding to the cell C5, and a cluster CL4 corresponding to the non-cell other than these cells, i.e., the background B and the debris are formed due to the difference in the image feature among various cells and the non-cell.

Then, in the classification of each of the blocks BL constituting the original image Ia, the block is classified into any one of clusters in accordance with which cluster the position occupied by the feature value vector representing the block in the multi-dimensional feature value space belongs to. For example, when the position indicated by the feature value vector is located inside any one of the cluster regions, it can be determined that the block belongs to the cluster.

Further, as shown in FIG. 8B, there may be a case where the distance between a point Pa whose position is indicated by the feature value vector of the block to be classified and each cluster is obtained and the block is classified into the cluster having the shortest distance. The distance between the point Pa and each cluster can be obtained, for example, in the following manner. For the clusters, respective distance reference points P1 to P4 are determined in advance. Herein, as each of the distance reference points P1 to P4, for example, the center point of gravity in a spatial domain occupied by each cluster in the feature value space can be used. Further, a point corresponding to an average position of the representative points indicated by the user may be used as the distance reference point. Then, with the distance between the point Pa and the distance reference points, the distance between the point Pa and the each cluster can be represented.

Thus, in the region dividing process of the present embodiment, the original image including the cells is divided into a plurality of small blocks, and the spatial frequency component for each block is obtained. Next, The feature value vector including the DC component feature value based on the intensity of the DC component among the spatial frequency components and the plurality of AC component feature values based on the respective intensities of the plurality of frequency components among the AC components is configured. Then, it is determined whether the image of the block corresponds to a cell or a non-cell other than the cells, or determined which type of cell the image corresponds to, in accordance with which cluster the position indicated in the feature value space by the feature value vector belongs to.

The DC component feature value represents the brightness. Further, the AC component feature value corresponding to a component of relatively low frequency is a feature value representing a texture having a relatively simple structure and the AC component feature value corresponding to a high-frequency component is a feature value representing a fine texture in the block. Thus, by comprehensively evaluating the brightness and the texture, it is possible to distinguish the cells and the non-cells in the image with higher accuracy than that of the region division through the simple binarization (image thresholding) process or outline extraction process. Therefore, even when the image includes a plurality of types of cells, it is possible to distinguish the cells by the type.

Note that the present invention is not limited to the above-described embodiment, and various modifications of the invention other than those described above are possible without departing from the scope of the invention. For example, in the region division of the original image in the above-described embodiment (Step S109), the original image is divided into the cell and the non-cell on a block basis. However, the block boundary is automatically drawn up and does not always coincide with the boundary between the cell and its surrounding in the original image. In view of this point, for example, division of the original image may be performed in combination with the well-known outline extraction process. Specifically, the position of the region boundary specified on a block basis as described above may be corrected on the basis of the result of the outline extraction process.

Further, the process for specifying the clusters in the multi-dimensional feature value space in the above-described embodiment is only one exemplary case, and various clustering methods other than the above method can be also applied. Furthermore, the method of collecting the typical examples of the cells and the non-cells is not also limited to the above method.

Further, the intensity of each frequency component is represented by the DCT coefficient obtained by the discrete cosine transform (DCT) process in the above-described embodiment. However, a method of obtaining appropriate spatial frequency components other than the DCT operation may be used.

Furthermore, though the general-purpose computer device 1 performs the region dividing process in the above-described embodiment, for example, this processing function may be incorporated in the imaging apparatus as described above. Further, by additionally implementing a program to perform the region dividing process of the present embodiment in the already-existing imaging apparatus, functionality expansion can be also achieved.

Furthermore, though specific values of the pixel size and the block size are exemplary shown in the above description, the region dividing process of the present embodiment can be performed even when the condition is out of these ranges of values. Furthermore, when only one type of cells are included in the image, in order to divide the region of the cells and the other region, the processing method of the present invention can be applied.

Thus, as has been described with the specific embodiment illustrated, in the present invention, there may be a case where for each block, two-dimensional discrete cosine transform based on the pixel values of the pixels included in the block is performed and the feature value is obtained on the basis of the discrete cosine transform coefficient of each frequency component. Such a process is also used in the JPEG-based image compression process and the computation algorithm is already established. This process can be also applied to the present invention since.

Further, a total of the discrete cosine transform coefficients in each of a plurality of groups into which the discrete cosine transform coefficients are grouped in accordance with a level (magnitude) of the spatial frequency or a value obtained by normalizing the total in accordance with the number of discrete cosine transform coefficients which are summed up may be used as the feature value. In such a configuration, for example, by collecting the discrete cosine transform coefficients having relatively close frequency components into one, the dimension of the feature value space can be lowered without losing any information on the characteristic features of the image and the computational load in the later process can be reduced.

In this case, the two-dimensional discrete cosine transform may be performed on the basis of the value obtained by subtracting the average pixel value of the whole original image from the pixel value of each pixel. In an image obtained by imaging cells which are almost transparent, since the distribution width of the pixel values is small, it is preferable to perform the level shift for the discrete cosine transform operation by using the average pixel value of the whole original image.

Further, the total of the intensities of the plurality of frequency components may be obtained as the sum of absolute values of the respective discrete cosine transform coefficients of the frequency components. Since the discrete cosine transform coefficient can take both a positive value and a negative value, there is a possibility that an excellent result cannot be obtained since the frequency components are offset in a simple sum. By adopting the sum of absolute values, this problem can be solved.

Furthermore, each block may be a square having a block size whose one side corresponds to four pixels. Though it is assumed in the JPEG-based image compression that the block size is (8×8) pixels, from the findings of the inventor of the present application, in the present invention in which it is not an object to compress and/or decompress images, a more excellent result can be achieved by adopting the block size of (4×4) pixels.

Further, before dividing the original image into blocks, a process of converting the pixel size of the original image, i.e., the original pixel size when acquired, into the pixel size for block division which is different from the original pixel size may be further provided. In the present invention in which the region division is performed by using the difference in the brightness and the texture between the cells and the non-cells other than the cells, the preferable pixel size in the operation depends on the size of the object in the image, such as the cells or the like. The pixel size for this operation does not always coincide with the preferable pixel size at the imaging, but by converting the pixel size, it is possible to optimize the pixel size individually.

Furthermore, in advance of the classification, a process of receiving instruction input from a user on respective representative points corresponding to the plurality of clusters in the original image, obtaining the feature value of the block including the representative point on the basis of the instruction input and specifying a range of each cluster in the multi-dimensional feature value space on the basis of the result may be further provided. In such a configuration, even when the type of cells or the imaging condition is not constant, it is possible to stably perform the division of the region of the cells or the other region.

Further, the original image may be an image obtained by bright field imaging of the cell. In general, since the cells are almost transparent and the difference in the refractive index between the cells and the culture medium is small, it is hard to distinguish between the cells and the non-cells by visual check in the bright field pickup image. By applying the present invention to such an image, it becomes possible to favorably and stably divide the region of the cells and the other region in the image.

The present invention can be applied to fields such as biochemistry and medical care where cells are imaged and the image is evaluated, and especially is suitable for technical fields where the imaging without any processing that gives some damages to the cells being cultured is needed.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. An image processing method, comprising:
    acquiring an original image which includes a cell which is cultured;
    dividing the original image into blocks each of which consists of a predetermined number of pixels and obtaining spatial frequency components that an image in each block has;
    classifying each of the blocks into a plurality of clusters in a multi-dimensional feature value space in which intensity of a DC component among the spatial frequency components and intensity of each of a plurality of AC components which are different in a spatial frequency from one another are regarded as feature values; and
    dividing the original image into a plurality of regions on the basis of a result of the classification,
    wherein for each block, two-dimensional discrete cosine transform based on the pixel values of the pixels included in the block is performed and the feature values are obtained on the basis of the discrete cosine transform coefficient of each frequency component,
    wherein the feature values are:
        a total of the discrete cosine transform coefficients in each of a plurality of groups into which the discrete cosine transform coefficients are grouped in accordance with a level of the spatial frequency; or
        a value obtained by normalizing the total in accordance with the number of discrete cosine transform coefficients which are summed up, and
    wherein the image processing method further comprises in advance of classifying:
        receiving an instruction input from a user on respective representative points corresponding to the plurality of clusters in the original image;
        obtaining the feature values of the block including the representative point on the basis of the instruction input; and
        specifying a range of each cluster in the multi-dimensional feature value space on the basis of the obtained feature values.

2. The image processing method according to claim 1, wherein the two-dimensional discrete cosine transform is performed on the basis of the value obtained by subtracting the average pixel value of the whole original image from the pixel value of each pixel.

3. The image processing method according to claim 1, wherein the total is obtained as a sum of absolute values of the respective discrete cosine transform coefficients.

4. The image processing method according to claim 1, wherein each block is a square having a block size whose one side corresponds to four pixels.

5. The image processing method according to claim 1, further comprising converting an original pixel size of the original image into a pixel size for block division which is different from the original pixel size before dividing the original image into blocks.

6. The image processing method according to claim 1, wherein the original image is an image obtained by bright field imaging of the cell.

7. A non-transitory computer readable recording medium having stored thereon a computer program configured to cause a computer to carry out the steps of claim 1.

8. An image processing method, comprising:
    acquiring an original image which includes a cell which is cultured;
    dividing the original image into blocks each of which consists of a predetermined number of pixels selected so that one block can be put inside the cell in the original image;
    performing two-dimensional discrete cosine transform for each block based on the pixel values of the pixels included in the block and obtaining discrete cosine transform coefficients corresponding to a plurality of spatial frequencies;
    classifying each of the blocks into a plurality of clusters in a multi-dimensional feature value space using feature values extracted from each block; and
    dividing the original image into a plurality of regions on the basis of a result of the classification, wherein
    the feature values include:
        a DC component of the discrete cosine transform coefficients; and
        a sum of absolute values of the discrete cosine transform coefficients of a group into which the discrete cosine transform coefficients representing AC components are grouped in accordance with a level of the spatial frequency, or a value obtained by normalizing the sum in accordance with a number of the discrete cosine transform coefficients which are summed up.

* * * * *